TAPE REEL HOLD-DOWN DEVICE

Filed May 7, 1958 3 Sheets-Sheet 1

INVENTOR.
George D. Rehklau
BY
Flehr and Swain
ATTORNEYS

TAPE REEL HOLD-DOWN DEVICE

Filed May 7, 1958

3 Sheets-Sheet 2

INVENTOR.
George D. Rehklau
BY
Fleher and Swain
ATTORNEYS

Sept. 11, 1962 G. D. REHKLAU 3,053,466

TAPE REEL HOLD-DOWN DEVICE

Filed May 7, 1958 3 Sheets-Sheet 3

INVENTOR.
George D. Rehklau

BY

Flehr & Swain
ATTORNEYS

United States Patent Office 3,053,466
Patented Sept. 11, 1962

3,053,466
TAPE REEL HOLD-DOWN DEVICE

George D. Rehklau, Menlo Park, Calif., assignor to Ampex Corporation, Redwood City, Calif., a corporation of California Filed May 7, 1958, Ser. No. 733,528
3 Claims. (Cl. 242—68.3)

This invention relates generally to devices for removably holding tape reels upon a turntable or like rotatable means.

Conventional magnetic tape machines employ pliable magnetic tape that is wound upon metal or plastic reels. The hubs of these reels may be of substantial diameter with an opening to accommodate hub engaging means carried by the turntable. One or more slots may be provided in the hub for engaging driving spurs on the turntable. In the past various devices have been used for releasably clamping or holding the reel upon the turntable. It is important, particularly for precision multichannel machines using tape reels of substantial size, to hold the reel properly aligned with respect to the axis of rotation, and with its one side in firm seating engagement with a seating surface on the turntable.

It is an object of the present invention to provide a novel tape reel holding device of the above type, which will provide firm accurate rotation of reels of substantial size.

Another object of the invention is to provide a tape reel holding device making use of retractable handle means for operating the same.

A further object of the invention is to provide a tape reel holding device having novel cam means which is manually operated to engage or release a tape reel, and which provides an effective holding and driving engagement.

Another object of the invention is to provide a device of the above character in which the elements which serve to engage and hold the reel upon the turntable likewise serve to form driving spurs.

Another object of the invention is to provide a simple assembly of the above character which normally has an attractive appearance, without members which project substantial distance from the reel.

Additional objects and features of the invention will appear from the following description in which the preferred embodiment has been set forth in detail in conjunction with the accompanying drawing.

Referring to the drawing.

Figure 1:
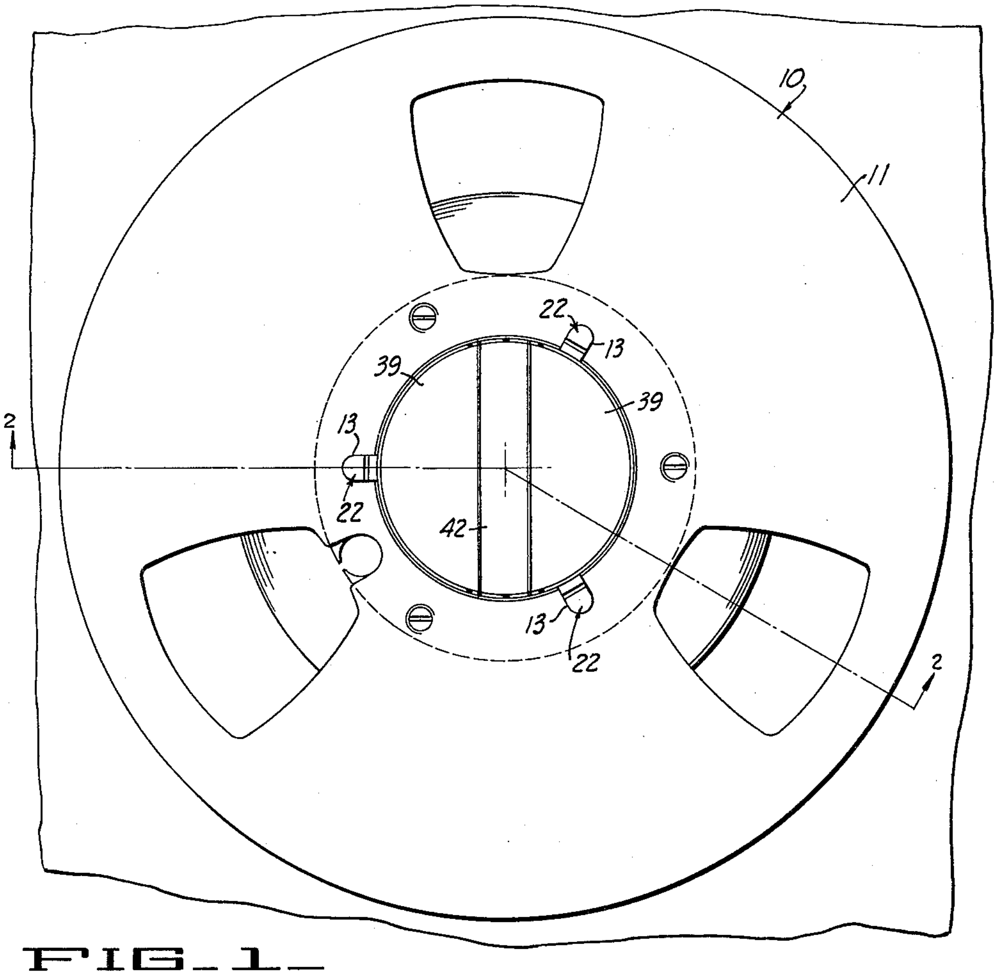
FIGURE 1 is a plan view illustrating the present invention together with a tape reel being held in operating position upon a turntable.
Figure 2:
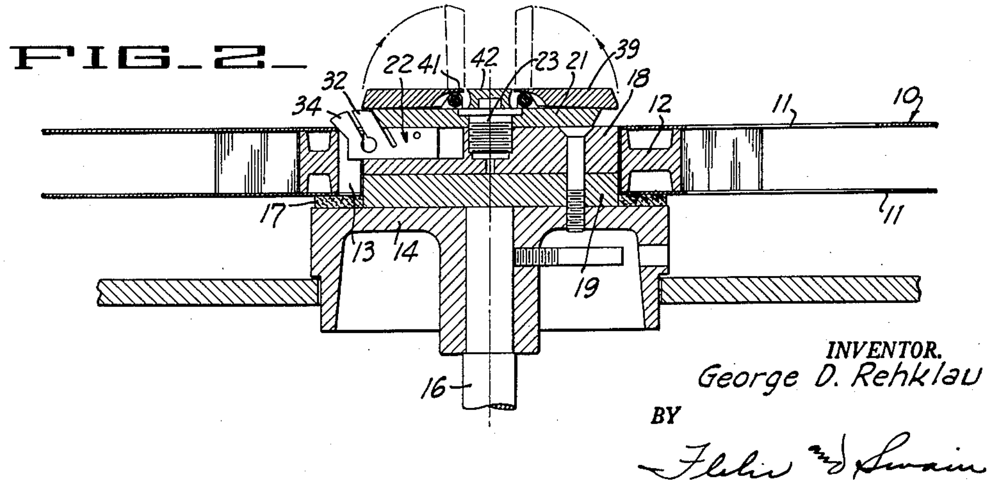
FIGURE 2 is a cross sectional view taken along the line 2—2 of FIGURE 1.

In FIGURES 1 and 2 there is shown a tape reel 10 which in this instance is made of metal. The side walls 11 are of circular configuration, and are attached to the rigid hub 12. The hub is provided with a plurality of circumferentially spaced slots 13, which in a conventional turntable are engaged by driving spurs.

The turntable illustrated consists of a rotatable rigid member 14 secured to the rotatable motor driven shaft 16.

An annular pad 17, of felt, rubber or like resilient material is carried by the outer face of the turntable member and forms a shoulder surface for seating the adjacent side of tape reel.

Figures 3, 4, 5:
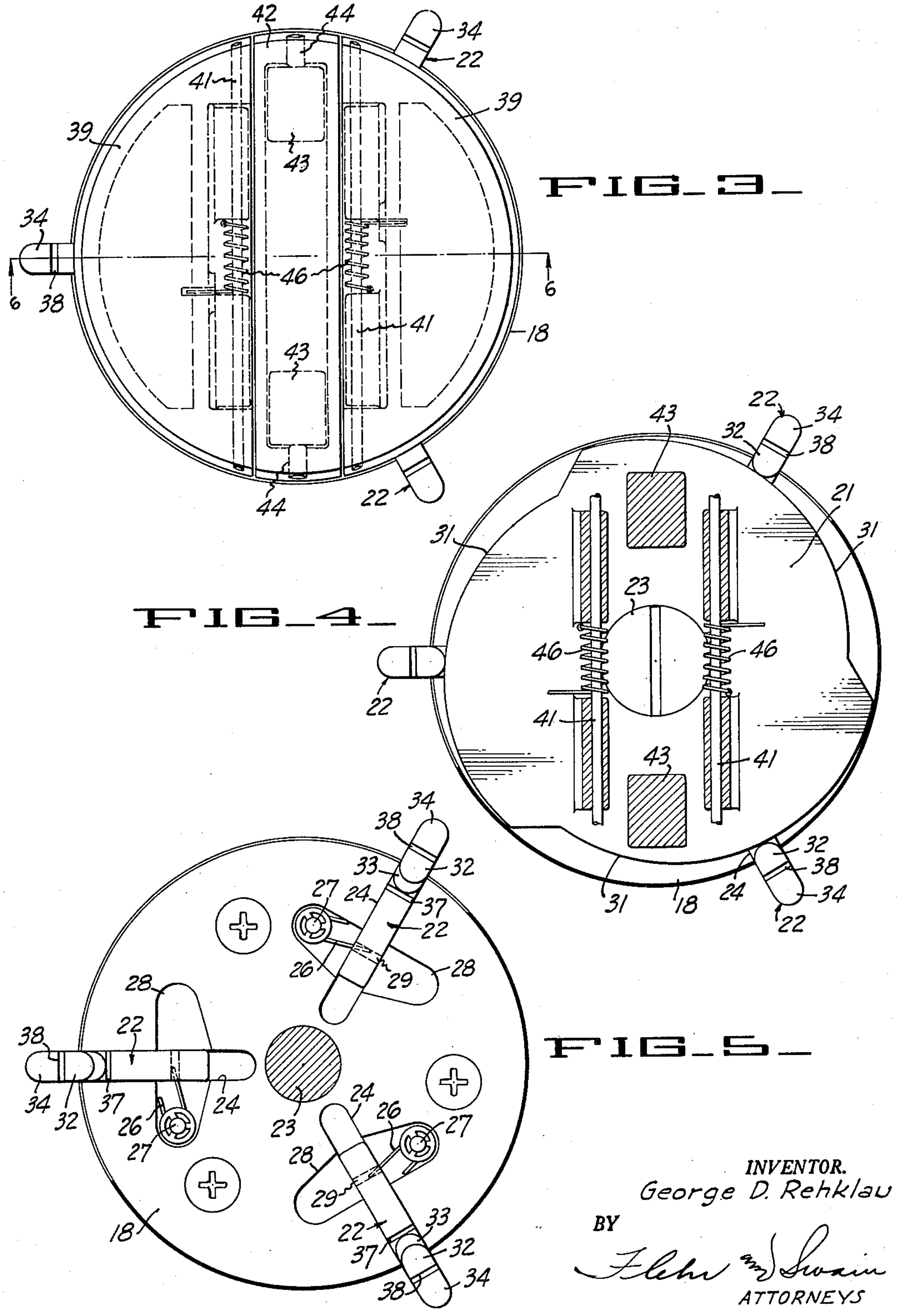
FIGURE 3 is a detail on an enlarged scale showing the handle means and associated operating parts in plan.
FIGURE 4 is a view like FIGURE 3, but with the handle members removed, and with certain parts shown in section.
FIGURE 5 is a view like FIGURE 3 but with the handle members and the operating cam removed and with certain parts shown in section.

The turntable also mounts body means consisting of the body 18, which may or may not be associated with the spacer 19. The spacer serves to adapt the device to a reel of given size. The body serves to mount reel engaging holding means of the cam type. This means includes the cam element 21, together with the cam operated elements 22. The cam element 21 is rotatably retained upon the body 18 by the central stud 23. The cam operated elements 22 are in the form of strips or bars which are slidably fitted within the radially extending slots or guideways 24, provided in the body 18 (FIGURE 5). Each of the elements 22 is yieldably urged toward its inner limiting or retracted position. For this purpose I have shown coiled wire springs 26, which are retained by the studs 27, and disposed within the body recesses 28 (FIGURE 5). The movable end of each wire spring engages within an opening 29 in the corresponding element 22.

The periphery of the rotary cam element 21 is contoured to provide a plurality of circumferentially spaced cam surfaces 31, (FIGURE 4). These surfaces are formed by beveling the periphery of the cam element. Each of the cam operated elements 22 is provided with a portion 32 (FIGURES 2 and 6) that extends adjacent the periphery of the cam element 21, and which provides an inclined surface 33 for engagement with a corresponding cam surface 31.

It will be evident that when the cam element 21 is turned between limiting positions corresponding to the extremities of the cam surface 31, the elements 22 are caused to be extended or retracted.

Figure 6:
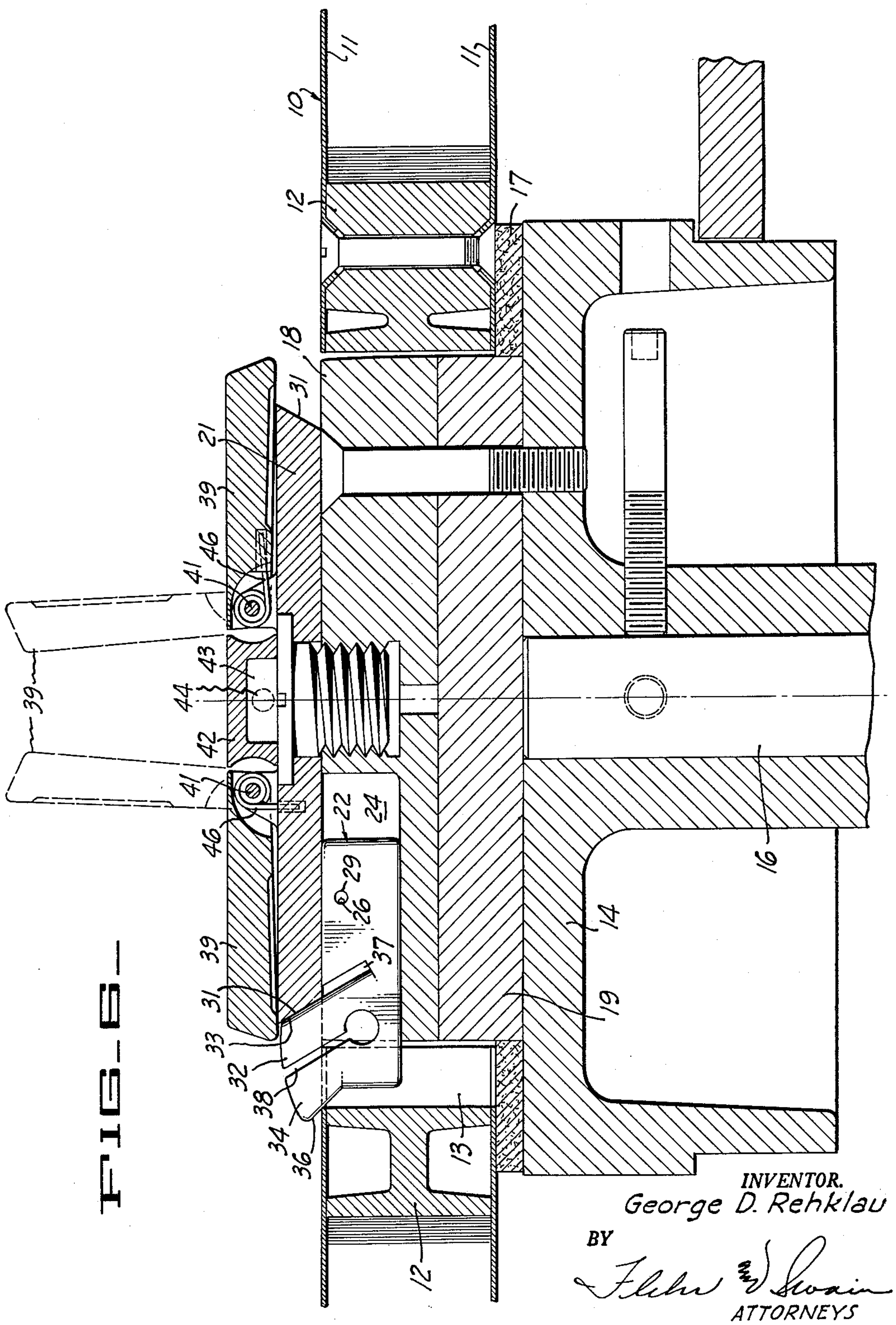
FIGURE 6 is a cross sectional detail taken along the line 6—6 of FIGURE 3, and on an enlarged scale.

The elements 22 also are provided with end portions 34 formed to provide the inclined surfaces 36. Portions 34 are dimensioned to interfit the reel slots 13, and the inclined surfaces 36 serve to engage the adjacent end edge of the hub as shown in FIGURE 6. Such engagement provides forces serving to urge the reel against the turntable pad 17, and in addition serves to centralize and to accurately align the reel with the axis of rotation of the turntable.

To facilitate manufacture, each of the elements 22 and the portions 32 and 34 of the same, can be formed of a single piece of material with slots 37 and 38 serving to separate the portions 32 and 34, and to provide a desirable amount of spring or give, which aids in obtaining the desired holding forces.

While it is possible to provide a simple knob or handle for turning the cam element 21 relative to the turntable, it is preferable to employ retractable handle means such as illustrated. Thus a pair of handle members 39 are mounted upon the cam element 21 by the hinge pins 41. These members may each have a configuration corresponding to the segment of a circle, whereby for the retracted positions shown in FIGURES 3 and 6, they overlie the cam element 21 with their outer peripheries overlying and extending beyond the periphery of the cam element. The inner and adjacent edges of the members 39 are parallel and spaced apart on opposite sides of the axis of rotation. A filler member 42 may be mounted upon the cam element 21, between the members 39, for surface continuity to enhance the appearance. The filler member can be releasably attached to the pads 43 on the cam element 21 (FIGURE 4), by means of set screws 44 (FIGURE 3).

The handle members 39 can be swung outwardly to their projected positions shown by dotted lines in FIGURE 6. In this position it will be apparent that they can be readily grasped by the operator for the purpose of turning the cam element 21 relative to the turntable. Suitable means such as the coil springs 46, serve to urge the members 39 to their retracted positions shown by solid lines in FIGURE 6.

Operation of my device is as follows: To apply a reel, the operator swings members 39 to their projected or extended positions shown in dotted lines in FIGURE 6, and then turns the cam element 21 through an angle sufficient to completely retract the elements 22. The reel is now applied to the turntable, with the portions 34 being accommodated within the reel slots 13. Thereafter the operator turns the handle members 39 in the opposite direction to bring the inclined surfaces 36 into firm engagement with the adjacent end edges of the reel hub as shown in FIGURE 6. Thereafter the members 39 are released, thereby permitting them to return to their normal positions adjacent the cam element 21.

In general my device provides a highly effective means for holding the tape reel upon the turntable, with automatic and accurate centering of the reel, and with effective driving interlock. The device can be used to advantage with the larger sized reels, such as are used with recording machines of the multichannel type. The device is relatively simple in its mechanical construction and is relatively simple to operate. In addition it provides an attractive appearance without parts which protrude an objectionable distance from the reel.

I claim:

1. In a device for releasably holding a reel upon the spindle of a turntable, the combination comprising: a reel hub defining a central bore fitting loosely over said spindle and provided with at least three equispaced axially directed grooves formed in the wall of said bore; a corresponding number of finger elements mounted on said spindle for radial movement with respect thereto, each element having a resilient outer end portion extending therefrom and into a corresponding one of said grooves, each of said end portions presenting an inclined first face facing radially outwardly and toward said turntable and pressingly engaging said hub at the edge thereof defined by the outermost wall of said corresponding groove and the side of said hub most remote from said turntable, each element also having a resilient operating portion extending therefrom and presenting an inclined second face facing radially inwardly and away from said turntable; a multi-faced cam mounted for coaxial rotation on said spindle, each face of said cam being inclined to flatly engage one of said second faces of said elements to urge and maintain said elements in extended position engaging said hub, said cam faces being curved to permit retraction of said elements upon rotation of said cam in one direction; spring means coupled to said elements and urging said elements toward a retracted position projecting from said spindle and engaging said grooves to permit guided axial movement of said reel hub on said spindle; and manually operable means for rotating said cam for retracting and extending said elements and for causing said elements to press as above described to lock said hub against both axial and rotational movement with respect to said turntable and to concurrently centralize said hub about the axis of said spindle.

2. In a device for releasably holding a reel upon the spindle of a turntable, the combination comprising: a reel hub defining a central bore fitting loosely over said spindle and provided with at least three equispaced axially directed grooves formed in the wall of said bore; a corresponding number of finger elements mounted on said spindle for radial movement only between a retracted position and an extended position, said retracted position being one in which said finger elements project from said spindle and extend into said grooves to permit guided axial movement of said reel hub on said spindle, and said extended position being one in which at least a portion of each of said elements extends into a respective one of said grooves and also engages the radially most outward threshold edge of said respective groove on the side of said hub opposite said turntable so as to press said hub radially outwardly and also in an axial direction against said turntable; said finger elements each having a resilient hub-engaging portion extending therefrom and presenting a hub-engaging face inclined radially outwardly and away from said turntable, so as to bear resiliently against said radially most outward threshold edge of said respective groove in said extended position; and means for retracting and extending said elements and for causing said elements to press as above described to lock said hub against both axial and rotational movement with respect to said turntable and to concurrently centralize said hub about the axis of said spindle.

3. In a device for releasably holding a reel upon the spindle of a turntable, the combination comprising: a reel hub defining a central bore fitting loosely over said spindle and provided with at least three equispaced axially directed grooves formed in the wall of said bore; a corresponding number of finger elements mounted on said spindle for radial movement between a retracted position and an extended position, said retracted position being one in which said finger elements projects from said spindle and extend into said grooves to permit guided axial movement of said reel hub on said spindle, and said extended position being one in which said elements engage said grooves and also engage the side of said hub opposite said turntable so as to press said hub radially outwardly and also in an axial direction against said turntable; each of said finger elements being spring loaded towards the axis of said spindle; and finger extending means including a multi-faced cam mounted for coaxial rotation on said spindle and engaging said elements to urge them outwardly, each of said elements being provided with a resilient portion extending from said element for engagement with said cam; and manual means for rotating said cam to lock said hub against both axial and rotational movement with respect to said turntable and to concurrently centralize said hub about the axis of said spindle.

References Cited in the file of this patent

UNITED STATES PATENTS

| | | |
|---|---|---|
| 1,055,604 | Carp | Mar. 11, 1913 |
| 1,946,455 | Davis | Feb. 6, 1934 |
| 2,221,089 | Githens et al. | Nov. 12, 1940 |
| 2,238,460 | Bruestle | Apr. 15, 1941 |
| 2,357,328 | Harris | Sept. 5, 1944 |
| 2,696,950 | Ranger | Dec. 14, 1954 |
| 2,745,604 | Masterson | May 20, 1956 |
| 2,772,809 | Ross | Dec. 4, 1956 |
| 2,928,620 | Stavrakis et al. | Mar. 15, 1960 |
| 2,983,460 | Wright | May 6, 1961 |